(12) United States Patent
Nammi

(10) Patent No.: US 11,140,013 B2
(45) Date of Patent: Oct. 5, 2021

(54) FACILITATING AN ANTENNA PORT SPECIFIC DOWNLINK CONTROL CHANNEL DESIGN FOR ADVANCED NETWORKS

(71) Applicant: AT&T Intellectual Property I, L.P., Atlanta, GA (US)

(72) Inventor: SaiRamesh Nammi, Austin, TX (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 55 days.

(21) Appl. No.: 16/383,527

(22) Filed: Apr. 12, 2019

(65) Prior Publication Data

US 2020/0145274 A1 May 7, 2020

Related U.S. Application Data

(60) Provisional application No. 62/754,890, filed on Nov. 2, 2018.

(51) Int. Cl.
| | |
|---|---|
| *H04L 27/26* | (2006.01) |
| *H04L 5/00* | (2006.01) |
| *H04J 13/00* | (2011.01) |

(52) U.S. Cl.
CPC .......... *H04L 27/2649* (2013.01); *H04L 5/005* (2013.01); *H04L 5/0057* (2013.01); *H04L 27/2614* (2013.01); *H04J 13/00* (2013.01)

(58) Field of Classification Search
CPC . H04L 27/2649; H04L 27/2614; H04L 5/005; H04L 5/0057; H04J 13/00
See application file for complete search history.

(56) References Cited

U.S. PATENT DOCUMENTS

| | | | |
|---|---|---|---|
| 7,551,639 B2* | 6/2009 | You | H04L 47/14 370/444 |
| 8,842,515 B2* | 9/2014 | Lee | H04J 13/0048 370/209 |

(Continued)

FOREIGN PATENT DOCUMENTS

| | | |
|---|---|---|
| EP | 2830384 A1 | 1/2015 |
| WO | 201400618 A1 | 1/2014 |
| WO | 2018152153 A1 | 8/2018 |

OTHER PUBLICATIONS

International Search Report and Written Opinion received for PCT Application Serial No. PCT/US2019/058983 dated Feb. 13, 2020, 16 pages.

(Continued)

*Primary Examiner* — Rasheed Gidado
(74) *Attorney, Agent, or Firm* — Amin, Turocy & Watson, LLP

(57) ABSTRACT

Facilitating port specific downlink control channel design for advanced networks (e.g., 4G, 5G, and beyond) is provided herein. Operations of a system can comprise receiving a first indication related to a quantity of demodulation reference signal ports and a second indication related to a code division multiplexing group associated with a mobile device. The operations can also comprise, based on the code division multiplexing group and the demodulation reference signal ports, facilitating a transmission of an adaptive downlink control channel structure of a downlink control channel that comprises a demodulation reference signal sequence initialization.

20 Claims, 10 Drawing Sheets

(56) References Cited

U.S. PATENT DOCUMENTS

| | | | |
|---|---|---|---|
| 9,084,254 B2 | 7/2015 | Su et al. | |
| 9,271,288 B2 | 2/2016 | Chen et al. | |
| 9,425,946 B2 | 8/2016 | Pourahmadi et al. | |
| 9,450,719 B2 | 9/2016 | Park et al. | |
| 9,860,900 B2 | 1/2018 | Kim et al. | |
| 9,888,466 B2 | 2/2018 | Seo | |
| 10,050,758 B2 | 8/2018 | Seo et al. | |
| 10,056,955 B2* | 8/2018 | Liu | H04L 27/2613 |
| 10,090,980 B2 | 10/2018 | Nammi et al. | |
| 2012/0213186 A1* | 8/2012 | Ng | H04L 5/0007 |
| | | | 370/329 |
| 2013/0142125 A1* | 6/2013 | Shimezawa | H04B 7/063 |
| | | | 370/328 |
| 2013/0308555 A1* | 11/2013 | Ho | H04L 5/0048 |
| | | | 370/329 |
| 2014/0307757 A1* | 10/2014 | Seo | H04B 1/707 |
| | | | 375/147 |
| 2015/0063234 A1* | 3/2015 | Park | H04L 5/0035 |
| | | | 370/329 |
| 2018/0026684 A1* | 1/2018 | Wei | H04L 5/0007 |
| | | | 370/329 |
| 2018/0263025 A1* | 9/2018 | Kim | H04W 4/40 |
| 2018/0278395 A1* | 9/2018 | Yoon | H04L 5/0051 |
| 2018/0287756 A1 | 10/2018 | Xia et al. | |
| 2019/0261281 A1* | 8/2019 | Jung | H04W 52/50 |
| 2019/0313428 A1* | 10/2019 | Zhou | H04W 48/12 |

OTHER PUBLICATIONS

3GPP, "3rd Generation Partnership Project; Technical Specification Group Radio Access Network; NR; Multiplexing and channel coding", Release 15, 3GPP TS 38.212 V15.3.0, Sep. 2018, pp. 1-99.
Ericsson, "On specification-based solutions to the DMRS PAPR issue", 3GPP TSG RAN WG1 Meeting #94-bis, R1-1811542, Chengdu, China, Oct. 8-12, 2018, pp. 1-5.

* cited by examiner

FACILITATING AN ANTENNA PORT SPECIFIC DOWNLINK CONTROL CHANNEL DESIGN FOR ADVANCED NETWORKS

CROSS-REFERENCE TO RELATED APPLICATIONS

This application claims the benefit of U.S. Provisional Application Ser. No. 62/754,890, filed Nov. 2, 2018, and entitled "FACILITATING AN ANTENNA PORT SPECIFIC DOWNLINK CONTROL CHANNEL DESIGN FOR ADVANCED NETWORKS," the entirety of which is expressly incorporated herein by reference.

TECHNICAL FIELD

This disclosure relates generally to the field of mobile communication and, more specifically, to downlink control channels in wireless communication systems for advanced networks (e.g., 4G, 5G, and beyond).

BACKGROUND

To meet the huge demand for data centric applications, Third Generation Partnership Project (3GPP) systems and systems that employ one or more aspects of the specifications of the Fourth Generation (4G) standard for wireless communications will be extended to a Fifth Generation (5G) standard for wireless communications. Unique challenges exist to provide levels of service associated with forthcoming 5G, or other next generation, standards for wireless communication.

BRIEF DESCRIPTION OF THE DRAWINGS

Various non-limiting embodiments are further described with reference to the accompanying drawings in which.

DETAILED DESCRIPTION

Figure 1:
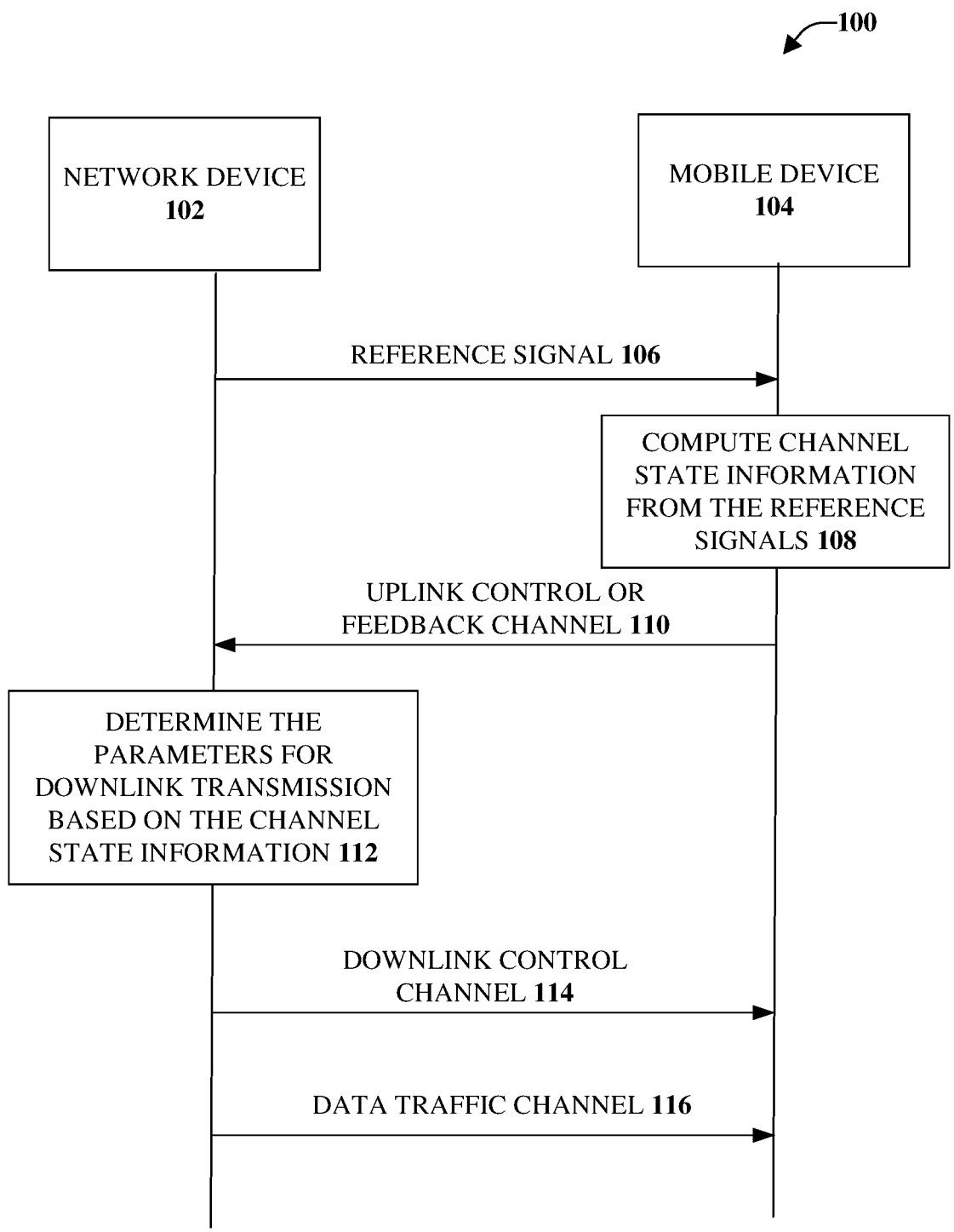
FIG. 1 illustrates an example, non-limiting, message sequence flow chart that can facilitate downlink data transfer in accordance with one or more embodiments described herein.

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details (and without applying to any particular networked environment or standard).

Described herein are systems, methods, articles of manufacture, and other embodiments or implementations that can facilitate an antenna port specific downlink control channel design for advanced networks. More specifically described herein are aspects related to wireless communication systems and related to indicating redundancy version in advanced networks.

To meet the huge demand for data centric applications, 4G standards can be applied to 5G, also called New Radio (NR) access. 5G networks can comprise the following: data rates of several tens of megabits per second supported for tens of thousands of users; 1 gigabit per second can be offered simultaneously (or concurrently) to tens of workers on the same office floor; several hundreds of thousands of simultaneous (or concurrent) connections can be supported for massive sensor deployments; spectral efficiency can be enhanced compared to 4G; improved coverage; enhanced signaling efficiency; and reduced latency compared to Long Term Evolution (LTE).

Multiple Input, Multiple Output (MIMO) systems can significantly increase the data carrying capacity of wireless systems. For these reasons, MIMO is an integral part of the third and fourth generation wireless systems (e.g., 3G and 4G). In addition, 5G systems also employ MIMO systems, which are referred to as massive MIMO systems (e.g., hundreds of antennas at the transmitter side (e.g., network) and/receiver side (e.g., user equipment). With a $(N_t, N_r)$ system, where Nt denotes the number of transmit antennas and Nr denotes the receive antennas, the peak data rate multiplies with a factor of $N_t$ over single antenna systems in rich scattering environment.

According to an embodiment, provided is a system the can comprise a processor and a memory that stores executable instructions that, when executed by the processor, facilitate performance of operations. The operations can comprise receiving a first indication related to a quantity of demodulation reference signal ports and a second indication related to a code division multiplexing group associated with a mobile device. The operations also can comprise, based on the code division multiplexing group and the quantity of demodulation reference signal ports, facilitating a transmission of an adaptive downlink control channel structure of a downlink control channel that comprises a demodulation reference signal sequence initialization. The downlink control channel can comprise a downlink control channel configured to operate according to a fifth generation wireless network communication protocol.

In an example, the code division multiplexing group can be a single code division multiplexing group. Further to this example, the demodulation reference signal sequence initialization can comprise one bit.

In another example, the second indication can indicate that the code division multiplexing group comprises a first code division multiplexing group and a second code division multiplexing group. Further to this example, the demodulation reference signal sequence initialization can comprise a first group of two bits for the first code division multiplexing group and a second group of two bits for the second code division multiplexing group.

According to an implementation, facilitating the transmission of the adaptive downlink control channel structure can comprise reducing a payload of the downlink control channel. In some implementations, receiving the first indication and the second indication can comprise receiving a third indication of a software release version of the mobile device satisfying a defined software release version. In these implementations, facilitating the transmission can comprise facilitating an adaptive control channel based on the software release version.

Facilitating the transmission can comprise, according to some implementations, scheduling the mobile device with a Type 1 demodulation reference signal via radio resource control signaling. In some implementations, facilitating the transmission can comprise scheduling the mobile device with a Type 2 demodulation reference signal. In accordance with these implementations, facilitating the transmission can comprise conveying a single bit for the demodulation reference signal sequence initialization. For example, conveying the single bit can comprise reducing a peak-to-average power ratio and a payload of the downlink control channel.

Another embodiment can relate to a method that can comprise determining, by a network device of a group of network devices in a communications network, a number of demodulation reference signal ports and a code division multiplexing group associated with a mobile device. The network device can comprise a processor. The method also can comprise sending, by the network device, a transmission of an adaptive downlink control channel structure of a downlink control channel to the mobile device. The adaptive downlink control channel structure can comprise a demodulation reference signal sequence initialization.

According to some implementations, the method can comprise scheduling, by the network device, a Type 1 demodulation reference signal to the mobile device. Further to these implementations, sending the transmission can comprise sending the transmission via radio resource control signaling.

The method can comprise, in accordance with some implementations, scheduling, by the network device, a Type 2 demodulation reference signal to the mobile device. Further to these implementations, sending the transmission can comprise transmitting a single bit for the demodulation reference signal sequence initialization. The method also can comprise, according to these implementations, mitigating, by the network device, a peak-to-average power ratio and a payload of the downlink control channel based on scheduling the Type 2 demodulation reference signal to the mobile device.

In accordance with some implementations, the method can comprise receiving, by the network device, first information indicative of the number of demodulation reference signal ports associated with the mobile device, and second information indicative of the code division multiplexing group associated with the mobile device. Further to these implementations, the second information can indicate that the code division multiplexing group comprises a first code division multiplexing group and a second code division multiplexing group. In addition, the demodulation reference signal sequence initialization can comprise a first group of two bits for the first code division multiplexing group and a second group of two bits for the second code division multiplexing group.

In some implementations, the code division multiplexing group can be a single code division multiplexing group. Further to these implementations, the demodulation reference signal sequence initialization can comprise one bit.

Another embodiment can relate to a machine-readable storage medium, comprising executable instructions that, when executed by a processor, facilitate performance of operations. The operations can comprise receiving, from a network device, information indicative of a type of demodulation reference signal scheduled for the user equipment device. The operations also can comprise receiving an indication of an adaptive downlink control channel structure of a downlink control channel that comprises a demodulation reference signal sequence initialization. For example, the adaptive downlink control channel structure can be determined as a function of the type of the demodulation reference signal scheduled for the user equipment device.

According to some implementations, the type of demodulation reference signal scheduled for the user equipment device can be a Type 2 demodulation reference signal configured for the user equipment device. Further to these implementations, the operations can comprise conveying a single bit for the demodulation reference signal sequence initialization. The operations also can comprise mitigating a peak-to-average power ratio and a payload of the downlink control channel based on the conveying the single bit.

Referring initially to FIG. 1, illustrated is an example, non-limiting, message sequence flow chart 100 that can facilitate downlink data transfer in accordance with one or more embodiments described herein. The message sequence flow chart 100 can be utilized for new radio, as discussed herein. As illustrated, the message sequence flow chart 100 represents the message sequence between a network device 102 (e.g., a General Node B, base station (gNB)) and a mobile device 104. As used herein, the term "network device 102" can be interchangeable with (or include) a network, a network controller or any number of other network components. One or more pilot signals and/or reference signals 106 can be transmitted from the network device 102 to the mobile device 104. The one or more pilot signals and/or reference signals 106 can be cell specific and/or user equipment specific signals. The one or more pilot signals and/or reference signals 106 can be beamformed or non-beamformed.

Based on the one or more pilot signals and/or reference signals 106, the mobile device 104 can compute the channel estimates and can compute the one or more parameters needed for channel state information (CSI) reporting, as indicated at 108. The CSI report can comprise, for example, channel quality indicator (CQI), preceding matrix index (PMI), rank information (RI), Channel State Information Reference Signal (CSI-RS) Resource Indicator (CRI the same as beam indicator), and so on, or any number of other types of information.

The CSI report can be sent from the mobile device 104 to the network device 102 via a feedback channel (e.g., uplink control or feedback channel 110). The CSI report can be sent on request from the network device 102, a-periodically, and/or the mobile device 104 can be configured to report periodically.

The network device 102, which can comprise a scheduler, can use the CSI report for determining the parameters for scheduling of the particular mobile device 104. For example, as indicated at 112, the network device 102 can determine the parameters for downlink transmission based on the channel state information. The parameters for downlink transmission can include but are not limited to: Modulation and Coding Scheme (MCS), power, Physical Resource Blocks (PRBs), and so on.

The network device 102 can send the scheduling parameters to the mobile device 104 in a downlink control channel (e.g., downlink control channel 114). After the scheduling parameter information is transmitted, the actual data transfer can take place from the network device 102 to the mobile device 104 over the data traffic channel 116.

Downlink reference signals are predefined signals occupying specific resource elements within the downlink time-frequency grid. There are several types of downlink reference signals that are transmitted in different ways and used for different purposes by the receiving terminal (e.g., the mobile device 104). For example, downlink reference signals can include CSI reference signals (CSI-RS) and demodulation reference signals (DM-RS).

CSI reference signals are specifically intended to be used by terminals (e.g., the mobile device 104) to acquire channel-state information (CSI) and beam specific information (beam RSRP). In 5G, CSI-RS is mobile device specific. Therefore, the CSI-RS can have a significantly lower time/frequency density.

Demodulation reference signals (also sometimes referred to as User Equipment (UE)-specific reference signals), are specifically intended to be used by terminals for channel estimation for data channel The label "UE-specific" relates to the fact that each demodulation reference signal is intended for channel estimation by a single terminal. That specific reference signal is then only transmitted within the resource blocks assigned for data traffic channel transmission to that terminal.

Other than the above-mentioned reference signals, there are other reference signals, namely phase tracking and tracking and sounding reference signals, which can be used for various purposes.

Figure 2A:
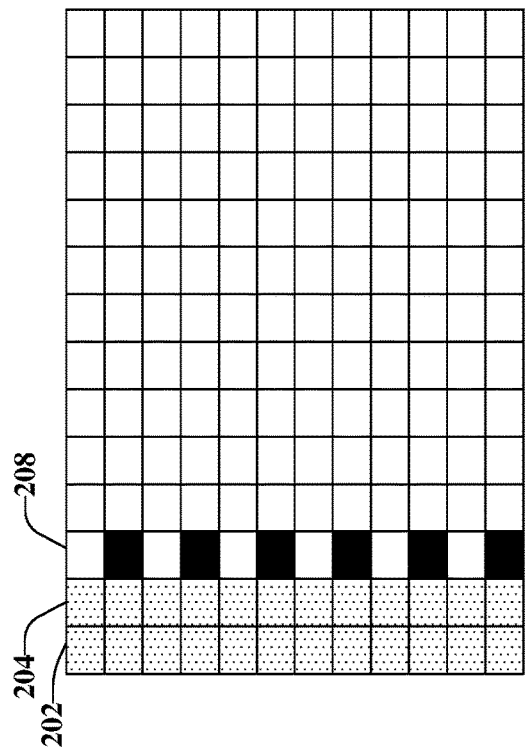
FIG. 2A illustrates resource mapping for antenna port one in accordance with one or more embodiments described herein.
Figure 2B:
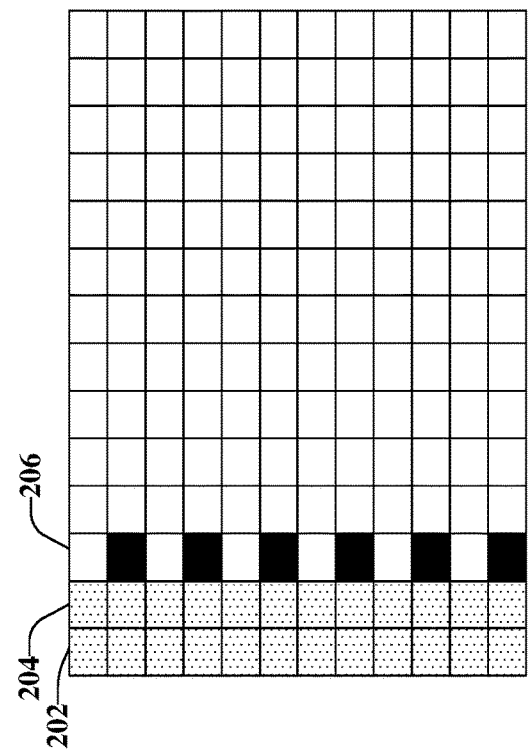
FIG. 2B illustrates resource mapping for antenna port two in accordance with one or more embodiments described herein.
Figure 2C:
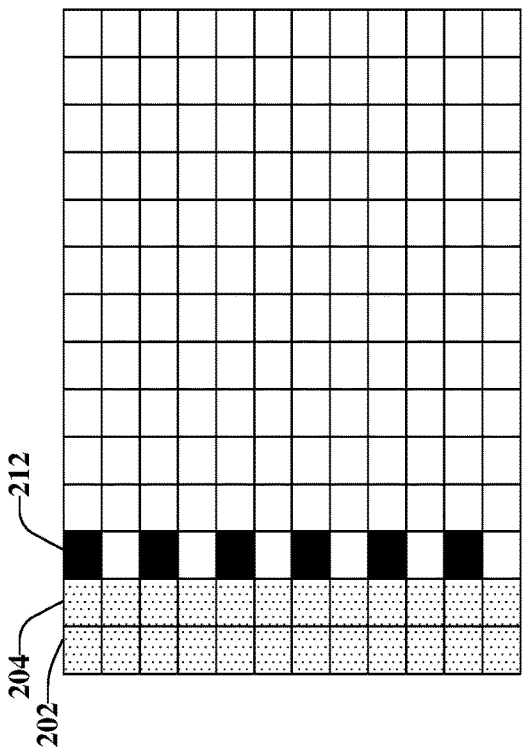
FIG. 2C illustrates resource mapping for antenna port three in accordance with one or more embodiments described herein.
Figure 2D:
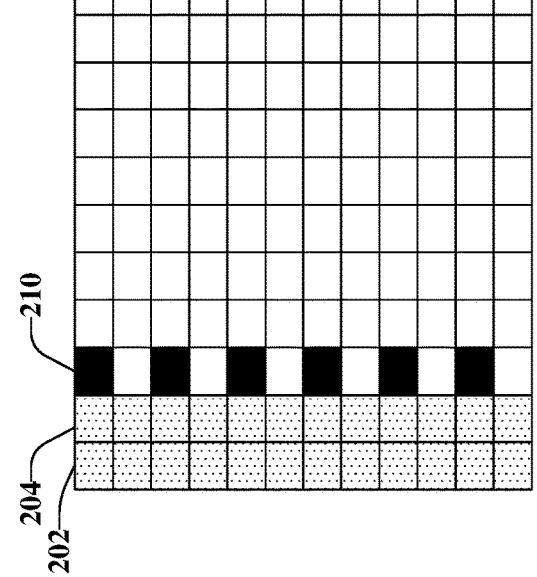
FIG. 2D illustrates resource mapping for antenna port four in accordance with one or more embodiments described herein.

FIGS. 2A to 2D illustrate non-limiting examples of resource mapping for a Demodulation Reference Signal (DM-RS) structure for up to four antenna ports in accordance with one or more embodiments described herein. Specifically, FIG. 2A illustrates resource mapping for antenna port one; FIG. 2B illustrates resource mapping for antenna port two; FIG. 2C illustrates resource mapping for antenna port three; and FIG. 2D illustrates resource mapping for antenna port four.

As indicated, FIGS. 2A to 2D illustrate an example of DM-RS structure for four antenna ports (hence maximum four layers and four DM-RS) in NR system. The first two OFDM symbols in FIGS. 2A-2D are control symbols (indicated by columns 202 and 204).

As illustrated in FIG. 2A, six reference symbols, indicated as the dark squares in the third OFDM symbol (e.g., indicated as third column 206) within a resource-block are transmitted for a single antenna port 0. As illustrated in FIG. 2B, the same reference symbols, indicated as the dark squares in the third OFDM symbol (indicated as the third column 208), are code multiplexed and transmitted on antenna port 1.

In a similar manner, for port 2 (FIG. 2C) and port 3 (FIG. 2D) the same resource elements are used for transmitting DMRS reference symbols. These are illustrated by the dark squares in the third column 210 of FIG. 2C and the third column 212 of FIG. 2D. However, they are code multiplexed as in port 0 and 1. Note that the resource elements are used for ranks 3 and 4 (ports 2 and 3) are orthogonal in frequency to that of port 0 and 1. The other reference symbols in FIGS. 2A to 2D can be utilized for data.

As the number of transmitted layers can vary dynamically, the number of transmitted DM-RS can also vary. The terminal can be informed about the number of transmitted layers (or the rank) as part of the scheduling information via downlink control channel as explained with respect to FIG. 1.

Similar to LTE, in NR the OFDM waveform can be used for both downlink and uplink transmissions. The transmit signals in an OFDM system can have high peak values in the time domain since many subcarrier components are added via an Inverse Fast Fourier Transform (IFFT) operation. Therefore, OFDM systems are known to have a high Peak-to-Average Power Ratio (PAPR), compared with single-carrier systems. In fact, the high PAPR is one of the most detrimental aspects in the OFDM system, as it decreases the Signal-to-Quantization Noise Ratio (SQNR) of Analog-to-Digital Converter (ADC) and Digital-to Analog Converter (DAC) while degrading the efficiency of the power amplifier in the transmitter.

An uplink control channel carries information about Hybrid Automatic Repeat Request (HARQ-ACK) information corresponding to the downlink data transmission, and channel state information. The channel state information can comprise CSI-RS Resource Indicator (CRI), Rank Indicator (RI), Channel Quality Indicator (CQI), Precoding Matrix Indicator (PMI), and Layer Indicator, and so on. The CSI can be divided into two categories. A first category can be for sub band and a second category can be for wideband. The configuration of subband and/or wideband CSI reporting can be performed through Radio Resource Control (RRC) signaling as part of CSI reporting configuration. Table 1 below illustrates example contents of an example CSI report for both wideband and side band. Specifically, Table 1 illustrates the contents of a report for PMI format indicator=Wideband, CQI format indicator=wideband and for PMI format indicator=subband, CQI format indicator=subband.

TABLE 1

| PMI-FormatIndicator = widebandPMI and CQI-FormatIndicator = widebandCQI | PMI-FormatIndicator = subbandPMI or CQI-FormatIndicator = subbandCQI | | |
|---|---|---|---|
| | CSI Part I | CSI Part II wideband | Subband |
| CRI | CRI | Wideband CQI for the second TB | Subband differential CQI for the second TB of all even subbands |
| Rank Indicator | Rank Indicator | PMI wideband (X1 and X2) | PMI subband information fields $X_2$ of all even subbands |
| Layer Indicator | Layer Indicator | — | Subband differential CQI for the second TB of all odd subbands |
| PMI wideband (X1 and X2) | Wideband CQI | — | PMI subband information fields $X_2$ of all odd subbands |
| Wideband CQI | Subband differential CQI for the first TB | — | — |

It is noted that for NR, the subband can be defined according to the bandwidth part of the OFDM in terms of PRBs as shown in Table 2 below, which illustrates configurable subband sizes. The sub band configuration can also be performed through RRC signaling.

TABLE 2

| Carrier bandwidth part (PRBs) | Subband Size (PRBs) |
|---|---|
| <24 | N/A |
| 24-72 | 4, 8 |
| 73-144 | 8, 16 |
| 145-275 | 16, 32 |

The downlink control channel (PDCCH) can carry information about the scheduling grants. This can comprise a number of MIMO layers scheduled, transport block sizes, modulation for each codeword, parameters related to HARQ, sub band locations, and so on. It is noted that all Downlink Control Information (DCI) formats may not use and/or transmit all the information as shown above. In general, the contents of PDCCH depends on transmission mode and DCI format.

In some cases, the following information is transmitted by means of the downlink control information (DCI) format: carrier indicator, identifier for DCI formats, bandwidth part indicator, frequency domain resource assignment, time domain resource assignment, Virtual Resource Block (VRB)-to-PRB mapping flag, PRB bundling size indicator, rate matching indicator, Zero Power (ZP) CSI-RS trigger, modulation and coding scheme for each Transport Block (TB), new data indicator for each TB, redundancy version for each TB, HARQ process number, downlink assignment index, Transmit Power Control (TPC) command for uplink control channel, Physical Uplink Control Channel (PUCCH) resource indicator, Physical Downlink Shared Channel (PDSCH)-to-HARQ feedback timing indicator, antenna port (s), transmission configuration indication, Sounding Reference Signal (SRS) request, Code Block Group (CBG) transmission information, CBG flushing out information, Demodulation Reference Signal (DMRS) sequence initialization, and so on.

Figure 3:
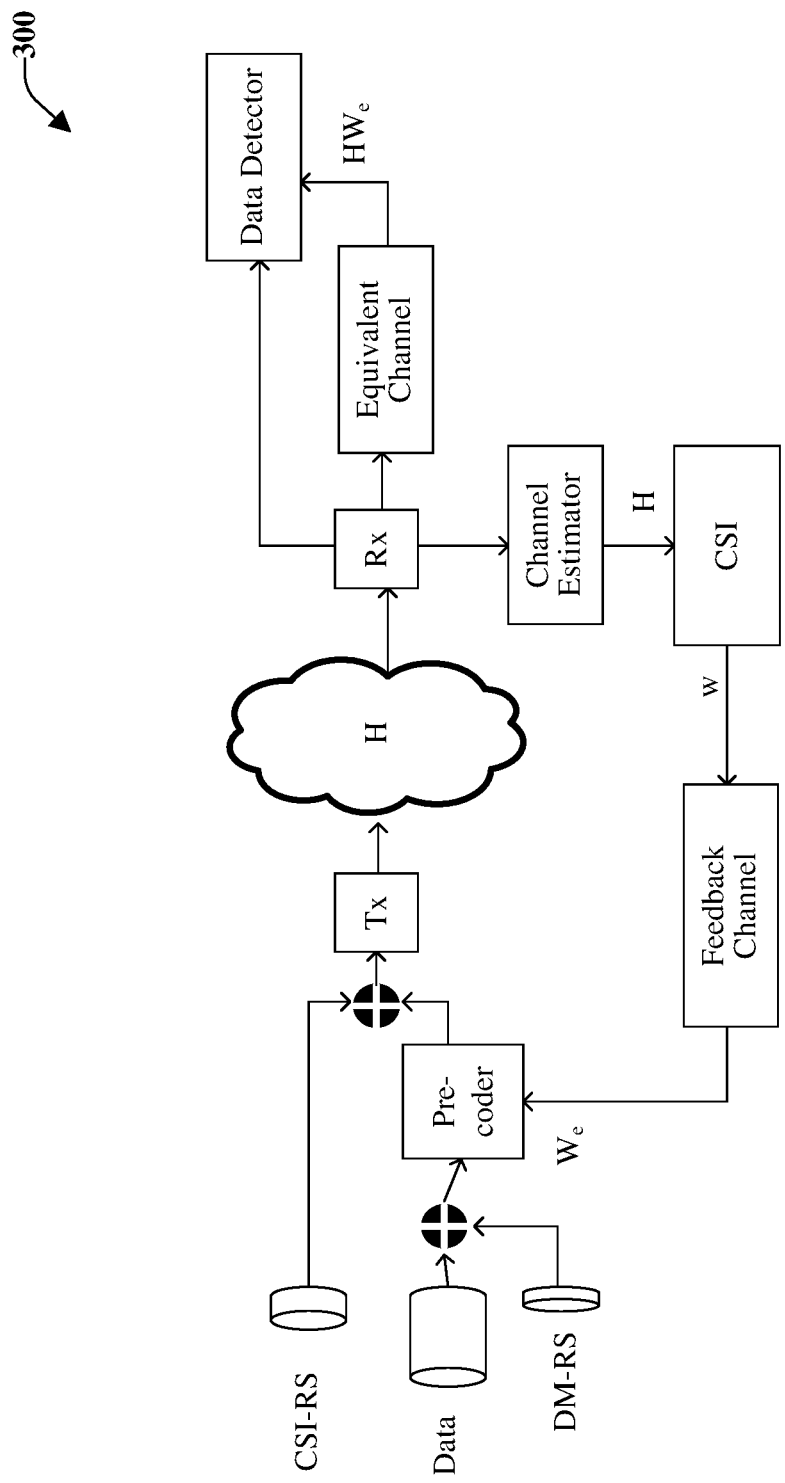
FIG. 3 illustrates an example, non-limiting, system diagram of a Multiple Input Multiple Output (MIMO) system with Demodulation Reference Signals (DM-RS) in accordance with one or more embodiments described herein.

FIG. 3 illustrates an example, non-limiting, system diagram 300 of a Multiple Input Multiple Output (MIMO) system with Demodulation Reference Signals (DM-RS) in accordance with one or more embodiments described herein. MIMO systems can significantly increase the data carrying capacity of wireless systems. MIMO can be used for achieving diversity gain, spatial multiplexing gain, and beamforming gain. For these reasons, MIMO is an integral part of 3G and 4G wireless systems. In addition, massive MIMO systems are currently under investigation for 5G systems.

At gNode B transmitter, common reference signals, namely CSI-RS are transmitted for channel sounding. UE receiver estimates channel quality (typically Signal-to-Interference Ratio (SINR)) from channel sounding, and computes the preferred precoding matrix (PMI), rank indicator (RI), and CQI for the next downlink transmission. This information is referred to as channel state information (CSI). The UE conveys this information through the feedback channel as discussed with respect to FIG. 1.

For downlink data transmission, the gNode B uses this information and chooses the precoding matrix as suggested by the UE (or it can choose on its own other than the UE recommended PMI), CQI and the transport block size, and so on. Finally, both the reference signal (DM-RS) and the data are multiplied by the precoding matrix selected by the gNode B and transmitted. The UE receiver estimates the effective channel (e.g., the channel multiplied by the precoding matrix) and demodulates the data.

Note that only 4×4 MIMO system is considered for describing the disclosed aspects, but the various aspects are equally applicable for 8 TX (Transmitter), and in general for any Nt≥2 Tx system whereby PMI and RI estimation is required. This disclosure interchangeably defines PMI as an index within a codebook or the PMI as a precoder itself depending on the context.

The embodiments are described in particular for closed-loop MIMO transmission scheme in NR, LTE based systems. However, the embodiments are applicable to any Radio Access Technology (RAT) or multi-RAT system where the UE operates using closed-loop MIMO (e.g., HSDPA, Wi-Fi/WLAN, WiMax, CDMA2000, and so on).

The embodiments are applicable to single carrier as well as to multicarrier (MC) or carrier aggregation (CA) operation of the UE in conjunction with MIMO in which the UE is able to receive and/or transmit data to more than one serving cells using MIMO. The term carrier aggregation (CA) is also called (e.g. interchangeably called) "multi-carrier system," "multi-cell operation," "multi-carrier operation," "multi-carrier" transmission and/or reception.

According to some implementations, a random sequence can be generated. The random sequence can be dependent on the Code Division Multiplexing (CDM) groups used for DMRS transmission thereby avoiding the repetition for ports 2 and 3. This in turn can reduce the PAPR problem for NR.

As mentioned above, the DMRS can be used for channel estimation for data demodulation. Pseudo random sequences can be used at the transmitter and at the receiver for estimating the channel. Note that the pseudo random sequences can be known at both the transmitter and at the receiver. The random sequence generation is described below:

The UE can assume the sequence r(n) is defined by:

$$r(n) = \frac{1}{\sqrt{2}}(1 - 2 \cdot c(2n)) + j\frac{1}{\sqrt{2}}(1 - 2 \cdot c(2n + 1)).$$

where the pseudo-random sequence c(i) is defined as:

$c(n)=(x_1(n+N_C)+x_2(n+N_C))\bmod 2$ $x_1(n+31)=(x_1(n+3)+x_1(n))\bmod 2$ $x_2(n+31)=(x_2(n+3)+x_2(n+2)+x_2(n+1)+x_2(n))\bmod 2$ where $N_C=1600$ and the first m-sequence $x_1(n)$ shall be initialized with $x_1(0)=1, x_1(n)=0, n=1,2,\ldots,30$. The initialization of the second m-sequence, $x_2(n)$, is denoted by $c_{init}=\Sigma_{i=0}^{30} x_2(i)\cdot 2^i$ with the value depending on the application of the sequence.

The pseudo-random sequence generator can be initialized with:

$c_{init}=(2^{17}(N_{symb}^{slot}n_{s,f}^{\mu}+l+1)(2N_{ID}^{nSCID}+1)+2N_{ID}^{nSCID}+n_{SCID})\bmod 2^{31}$ where l is the OFDM symbol number within the slot, $n_{s,f}^{\mu}$ is the slot number within a frame, and $N_{ID}^{0}, N_{ID}^{1} \in \{0,1,\ldots,65535\}$ are given by the higher-layer parameters scramblingID0 and scramblingID1, respectively, in the DMRS-DownlinkConfig IE if provided and the PDSCH is scheduled by PDCCH using DCI format 1_1 with the CRC scrambled by C-RNTI, MCS-C-RNTI, or CS-RNTI $N_{ID}^{0} \in \{0,1,\ldots,65535\}$ is given by the higher-layer parameter scramblingID0 in the DMRS-DownlinkConfig IE if provided and the PDSCH is scheduled by PDCCH using DCI format 1_0 with the CRC scrambled by C-RNTI, MCS-C-RNTI, or CS-RNTI;

$N_{ID}^{nSCID}=N_{ID}^{cell}$ otherwise;

The quantity $n_{SCID} \in \{0,1\}$ is given by the DM-RS sequence initialization field in the DCI associated with the PDSCH transmission if DCI format 1_1 is used, otherwise $n_{SCID}=0$.

That is, instead of using one bit for DMRS sequence initialization, two bits can be used for initializing DMRS sequences. Thus, two separate sequences can be generated if $n_{SCID}$ is changed. Therefore, a first sequence can be generated with $n_{SCID}=0$ and a second sequence can be generated with $n_{SCID}=1$. Therefore, according to various implementations, an advantage of using two bits (e.g., two fields) in the DCI can be to reduce the PAPR for Type 1 DMRS pattern.

Accurate control channel reception is needed for decoding data traffic channels. Therefore, it can be preferable to use more parity bits for encoding the control channel payload. However, increasing the reliability by adding more parity bits increases the signaling overhead of the control channel and the number resource elements needed for data transmission will be less. This in turn reduces the throughput and the capacity of the NR system.

The various aspects provide efficient mechanisms to mitigate and/or reduce the signaling overhead of the control channels. Thus, the various aspects can facilitate transmission of the downlink control information with reduced overhead. According to some implementations, provided is a system, method, and/or machine-readable storage medium that can indicate DMRS sequence initiation using an adaptive control channel based on the Code Division Multiplexing (CDM) group used for DMRS ports. Additionally, or alternatively, provided is a system, method, and/or machine-readable storage medium that can indicate DMRS sequence initiation using an adaptive control channel based on the type of the DMRS.

With the disclosed aspects, various advantages can be achieved. For example, since the design can be efficient in terms of power, the power utilized for transmitting downlink control channel can be minimized (e.g., conserved). This conserved power can be used for data transmission. Accordingly, with improved data transmission power, the link and system throughput can be improved significantly.

It is noted that although the various aspects are described for downlink data transmission for MIMO systems, the same or similar principles can be applicable for uplink and side link systems.

In some embodiments, the non-limiting term radio network node or simply network node is used and it refers to any type of network node serving UE and/or connected to other network nodes or network elements or any radio node from where a UE receives signal. Examples of radio network nodes are Node B, Base Station (BS), Multi-Standard Radio (MSR) radio node such as MSR BS, gNodeB, eNode B, network controller, radio network controller (RNC), base station controller (BSC), relay, donor node controlling relay, base transceiver station (BTS), access point (AP), transmission points, transmission nodes, Remote Radio Unit (RRU), Remote Radio Head (RRH), nodes in distributed antenna system (DAS) etc. system.

In some embodiments the non-limiting term user equipment (UE) is used and it refers to any type of wireless device communicating with a radio network node in a cellular or mobile communication system. Examples of UE are target device, device to device (D2D) UE, machine type UE or UE capable of machine to machine (M2M) communication, PDA, iPad, tablet, mobile terminals, smart phone, laptop embedded equipped (LEE), laptop mounted equipment (LME), USB dongles etc.

The subject matter discussed herein can comprise the following aspects and multiple embodiments. A system, method, machine-readable storage medium, other embodiments, and/or other implementations that can indicate DMRS sequence initialization using an adaptive downlink control channel structure based on the CDM group of the ports. A system, method, machine-readable storage medium, other embodiments, and/or other implementations that can indicate DMRS sequence initialization using an adaptive downlink control channel structure based on the type of the DMRS. These embodiments will be described below. It is noted that the various embodiments are described assuming DMRS sequence initialization in DCI for PDSCH. However, the same can be applicable for DMRS sequence initialization in DCI for PUSCH transmission.

According to some implementations, provided is a method to indicate DMRS sequence initialization using an adaptive downlink control channel based on the CDM groups of the DMRS ports. Table 3 below illustrates the port numbers and the CDM group for Type 1 configuration of DMRS.

TABLE 3

Parameters for PDSCH DM-RS configuration type 1.

| p | CDM group λ | Δ | $w_f(k')$ k' = 0 | $w_f(k')$ k' = 1 | $w_t(l')$ l' = 0 | $w_t(l')$ l' = 1 |
|---|---|---|---|---|---|---|
| 1000 | 0 | 0 | +1 | +1 | +1 | +1 |
| 1001 | 0 | 0 | +1 | −1 | +1 | +1 |
| 1002 | 1 | 1 | +1 | +1 | +1 | +1 |
| 1003 | 1 | 1 | +1 | −1 | +1 | +1 |
| 1004 | 0 | 0 | +1 | +1 | +1 | −1 |
| 1005 | 0 | 0 | +1 | −1 | +1 | −1 |
| 1006 | 1 | 1 | +1 | +1 | +1 | −1 |
| 1007 | 1 | 1 | +1 | −1 | +1 | −1 |

Table 4 below illustrates the Index, which is indicated in the DCI. For example if the network indicates index 0, this means rank 1 transmission with CDM group 0. If index is equal to 2, this means it is rank 2 transmission with ports 1000 and 1001 with same CDM group. However, if, for example, the index is equal to 9, 10 then it is rank 3 transmission and rank 4 transmission. However the number of CDM groups can be equal to 2. Where the first 2 ports belong to one CDM group and the remaining ports belong to another CDM group.

TABLE 4

Antenna port(s) (1000 + DMRS port), dmrs-Type = 1, maxLength = 1
One Codeword: Codeword 0 enabled, Codeword 1 disabled

| Value | Number of DMRS CDM group(s) without data | DMRS port(s) |
|---|---|---|
| 0 | 1 | 0 |
| 1 | 1 | 1 |
| 2 | 1 | 0, 1 |
| 3 | 2 | 0 |
| 4 | 2 | 1 |
| 5 | 2 | 2 |
| 6 | 2 | 3 |
| 7 | 2 | 0, 1 |
| 8 | 2 | 2, 3 |
| 9 | 2 | 0-2 |
| 10 | 2 | 0-3 |
| 11 | 2 | 0, 2 |
| 12-15 | Reserved | Reserved |

That is, if the DCI indicates an index with only one CDM group, then the DMRS initialization contains only one (1) bit. However, if the CDM group contains two CDM groups then there can be two bits for DMRS initialization for each CDM group.

Accordingly, with the disclosed aspects, the DCI payload can be adaptively changed based on the number of CDM groups.

Figure 4:
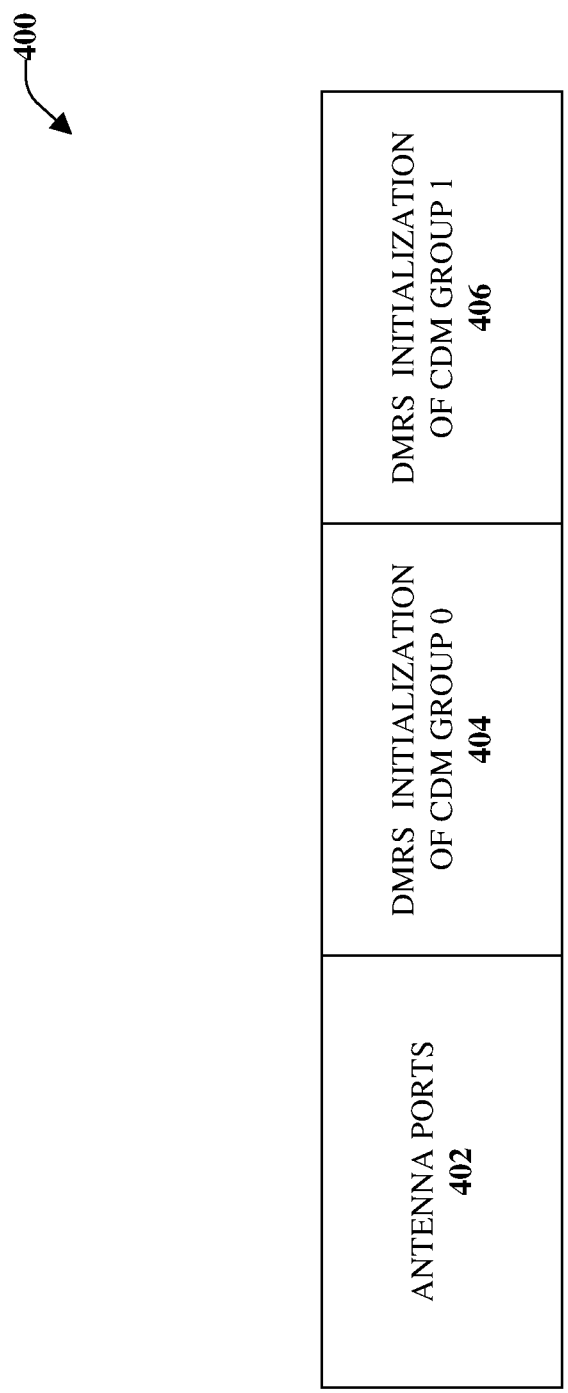
FIG. 4 illustrates an example, non-limiting, downlink control channel in accordance with one or more embodiments described herein.

FIG. 4 illustrates an example, non-limiting, downlink control channel 400 in accordance with one or more embodiments described herein. As illustrated, the downlink control channel 400 can include a number (e.g., quantity) of antenna ports 402, a DMRS initialization of a first CDM group 404 (e.g., group 0), and a DMRS initialization of a second CDM group 406 (e.g., group 1).

According to some implementations, provided is a method to indicate DMRS sequence initialization using an adaptive downlink control channel based on the Type of DMRS. It is noted that the disclosed aspects can apply for when the UE is scheduled with Type 1 DMRS using RRC signalling. However, when the UE is configured with Type 2 configuration, the number of CDM groups can be more than 1 as shown in Table 5 below.

TABLE 5

Parameters for PDSCH DM-RS configuration type 2.

| p | CDM group λ | Δ | $w_f(k')$ k' = 0 | $w_f(k')$ k' = 1 | $w_t(l')$ l' = 0 | $w_t(l')$ l' = 1 |
|---|---|---|---|---|---|---|
| 1000 | 0 | 0 | +1 | +1 | +1 | +1 |
| 1001 | 0 | 0 | +1 | −1 | +1 | +1 |
| 1002 | 1 | 2 | +1 | +1 | +1 | +1 |
| 1003 | 1 | 2 | +1 | −1 | +1 | +1 |
| 1004 | 2 | 4 | +1 | +1 | +1 | +1 |
| 1005 | 2 | 4 | +1 | −1 | +1 | +1 |
| 1006 | 0 | 0 | +1 | +1 | +1 | −1 |
| 1007 | 0 | 0 | +1 | −1 | +1 | −1 |
| 1008 | 1 | 2 | +1 | +1 | +1 | −1 |
| 1009 | 1 | 2 | +1 | −1 | +1 | −1 |
| 1010 | 2 | 4 | +1 | +1 | +1 | −1 |
| 1011 | 2 | 4 | +1 | −1 | +1 | −1 |

For Type 2, the same approach as that of Type 1 can be utilized. However, the worst case payload is 3 bits for DMRS sequence initialization. Instead Cinit expression which contains DMRS CDM group can be changed. Therefore, the PAPR for Type 2 can be reduced and/or mitigated, while at the same time the payload of the downlink control channel can be reduced and/or mitigated.

Therefore, for Type 1, downlink control channel payload can be different when the UE is configured with Type 1 using RRC signalling. Similarly, if the UE is configured with Type 2 DMRS configuration, then the DCI payload can be different compared to that of Type 1.

Figure 5:
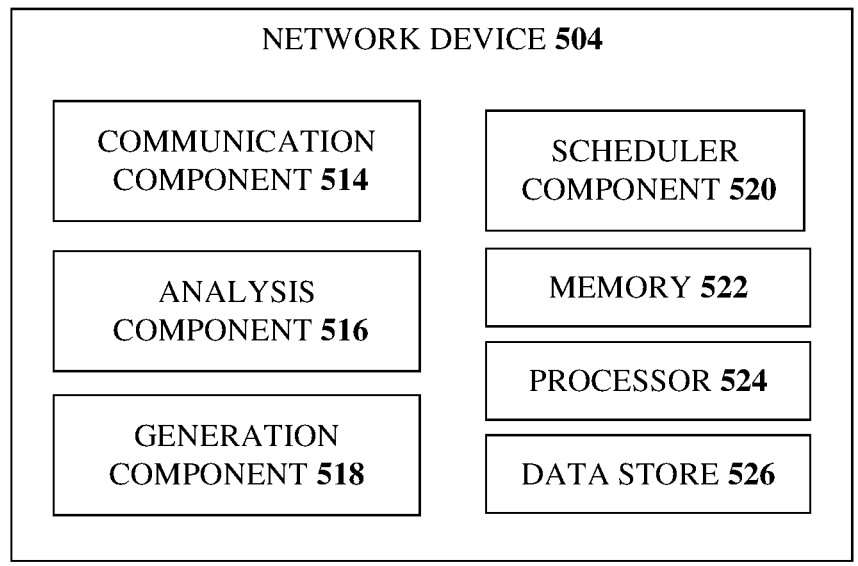
FIG. 5 illustrates an example, non-limiting, system for facilitating an antenna port specific downlink control channel design for advanced networks in accordance with one or more embodiments described herein.
Figure 5:
Figure 5:
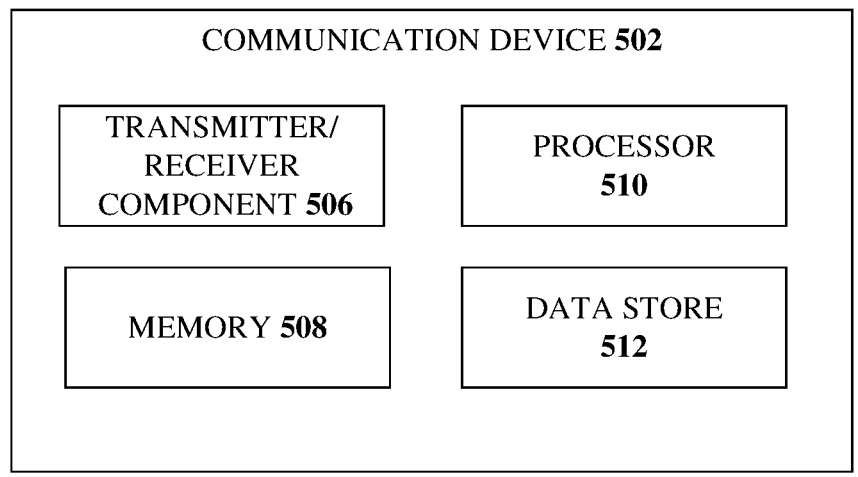

FIG. 5 illustrates an example, non-limiting, system 500 for facilitating an antenna port specific downlink control channel design for advanced networks in accordance with one or more embodiments described herein. Aspects of systems (e.g., the system 500 and the like), apparatuses, or processes explained in this disclosure can constitute machine-executable component(s) embodied within machine(s) (e.g., embodied in one or more computer readable mediums (or media) associated with one or more machines). Such component(s), when executed by the one or more machines (e.g., computer(s), computing device(s), virtual machine(s), and so on) can cause the machine(s) to perform the operations described.

In various embodiments, the system 500 can be any type of component, machine, device, facility, apparatus, and/or instrument that comprises a processor and/or can be capable of effective and/or operative communication with a wired and/or wireless network. Components, machines, apparatuses, devices, facilities, and/or instrumentalities that can comprise the system 500 can include tablet computing devices, handheld devices, server class computing machines and/or databases, laptop computers, notebook computers, desktop computers, cell phones, smart phones, consumer appliances and/or instrumentation, industrial and/or commercial devices, hand-held devices, digital assistants, multimedia Internet enabled phones, multimedia players, and the like.

As illustrated in FIG. 5, the system 500 can include a communication device 502 and a network device 504. The network device 504 can be included in a group of network devices of a wireless network. Although only a single communication device and a single network device are shown and described, the various aspects are not limited to this implementation. Instead, multiple communication devices and/or multiple network devices can be included in a communications system.

The communication device 502 can include a transmitter/receiver component 506, at least one memory 508, at least one processor 510, and at least one data store 512. The network device 504 can include a communication component 514, an analysis component 516, a generation component 518, a scheduler component 520, at least one memory 522, at least one processor 524, and at least one data store 526.

The transmitter/receiver component 506 can send, to the network device 504, a first indication related to a quantity of demodulation reference signal ports associated with the communication device 502. The transmitter/receiver component 506 also can send, to the network device 504, a second indication related to a code division multiplexing group associated with the communication device 502. The first information and the second information can be received, at the network device 504, via the communication component 514.

Based on the code division multiplexing group and the quantity of demodulation reference signal ports, which can be evaluated by the analysis component 516, the generation component 518 can establish an adaptive downlink control channel structure of a downlink control channel The adaptive downlink control channel structure can comprise a demodulation reference signal sequence initialization. The communication component 514 can facilitate a transmission of the adaptive downlink control channel structure, and the demodulation reference signal sequence initialization, to the communication device 502. The downlink control channel can comprise a downlink control channel configured to operate according to a fifth generation wireless network communication protocol. In an example, by facilitating the transmission of the adaptive downlink control channel structure, the network device 504, can reduce a payload of the downlink control channel.

According to some implementations, the code division multiplexing group can be a single code division multiplexing group. Further to these implementations, the demodulation reference signal sequence initialization can comprise one bit.

In an example, the second indication can indicate that the code division multiplexing group comprises a first code division multiplexing group and a second code division multiplexing group. Further, the demodulation reference signal sequence initialization can comprise a first group of two bits for the first code division multiplexing group and a second group of two bits for the second code division multiplexing group.

A third indication can be received at the communication component 514 (e.g., transmitted by the communication device 502 via the transmitter/receiver component 506). The third indication can be an indication of a software release version of the communication device 502 satisfying a defined software release version. In this case, the communication component 514 can facilitate transmission of an adaptive control channel based on the software release version.

As another example, the scheduler component 520 can schedule the communication device 502 with a Type 1 demodulation reference signal via radio resource control signaling. In another example, the scheduler component 520 can schedule the communication device 502 with a Type 2 demodulation reference signal and the communication component 514 can convey a single bit for the demodulation reference signal sequence initialization. For example, conveyance of the single bit (e.g., via the communication component 514) can reduce a peak-to-average power ratio and a payload of the downlink control channel.

With continuing reference to FIG. 5, the transmitter/receiver component 506 (and/or the communication component 514) can be configured to transmit to, and/or receive data from, the network device 504 (or the communication device 502), other network devices, and/or other communication devices. Through the transmitter/receiver component 506 (and/or the communication component 514), the communication device 502 (and/or the network device 504) can concurrently transmit and receive data, can transmit and receive data at different times, or combinations thereof. According to some implementations, the transmitter/receiver component 506 (and/or the communication component 514) can facilitate communications between an identified entity associated with the communication device 502 (e.g., an owner of the communication device 502, a user of the communication device 502, and so on) and another communication device (e.g., or an entity associated with the other communication device). Further, the transmitter/receiver component 506 (and/or the communication component 514) can be configured to receive, from the network device 504 or other network devices, various content including multimedia content.

The at least one memory 508 can be operatively connected to the at least one processor 510. Further, the at least one memory 522 can be operatively connected to the at least one processor 524. The memories (e.g., the at least one memory 508, the at least one memory 522) can store executable instructions that, when executed by the processors (e.g., the at least one processor 510, the at least one processor 524) can facilitate performance of operations. Further, the processors can be utilized to execute computer executable components stored in the memories.

For example, the memories can store protocols associated with securely conveying location and other information as discussed herein. Further, the memories can facilitate action to control communication between the communication device 502 and the network device 504 such that the system 500 can employ stored protocols and/or algorithms to achieve improved communications in a wireless network as described herein.

The memories can store respective protocols associated with facilitating an antenna port specific downlink control channel design, taking action to control communication between the communication device 502 and the network device 504, such that the system 500 can employ stored protocols and/or algorithms to achieve improved communications in a wireless network as described herein. It should be appreciated that data stores (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

The processors can facilitate respective analysis of information related to facilitating an antenna port specific downlink control channel design in a communication network. The processors can be processors dedicated to analyzing and/or generating information received, a processor that controls one or more components of the system 500, and/or a processor that both analyzes and generates information received and controls one or more components of the system 500.

Further, the term network device (e.g., network node, network node device) is used herein to refer to any type of network node serving communication devices and/or connected to other network nodes, network elements, or another network node from which the communication devices can receive a radio signal. In cellular radio access networks (e.g., universal mobile telecommunications system (UMTS) networks), network nodes can be referred to as base transceiver stations (BTS), radio base station, radio network nodes, base stations, NodeB, eNodeB (e.g., evolved NodeB), and so on. In 5G terminology, the network nodes can be referred to as gNodeB (e.g., gNB) devices. Network nodes can also comprise multiple antennas for performing various transmission operations (e.g., MIMO operations). A network node can comprise a cabinet and other protected enclosures, an antenna mast, and actual antennas. Network nodes can serve several cells, also called sectors, depending on the configuration and type of antenna. Examples of network nodes (e.g., network device 504) can include but are not limited to: NodeB devices, base station (BS) devices, access point (AP) devices, and radio access network (RAN) devices. The network nodes can also include multi-standard radio (MSR) radio node devices, comprising: an MSR BS, an eNode B, a network controller, a radio network controller (RNC), a base station controller (BSC), a relay, a donor node controlling relay, a base transceiver station (BTS), a transmission point, a transmission node, an Remote Radio Unit (RRU), a Remote Radio Head (RRH), nodes in distributed antenna system (DAS), and the like.

Methods that can be implemented in accordance with the disclosed subject matter, will be better appreciated with reference to the following flow charts. While, for purposes of simplicity of explanation, the methods are shown and described as a series of blocks, it is to be understood and appreciated that the disclosed aspects are not limited by the number or order of blocks, as some blocks can occur in different orders and/or at substantially the same time with other blocks from what is depicted and described herein. Moreover, not all illustrated blocks can be required to implement the disclosed methods. It is to be appreciated that the functionality associated with the blocks can be implemented by software, hardware, a combination thereof, or any other suitable means (e.g. device, system, process, component, and so forth). Additionally, it should be further appreciated that the disclosed methods are capable of being stored on an article of manufacture to facilitate transporting and transferring such methods to various devices. Those skilled in the art will understand and appreciate that the methods could alternatively be represented as a series of interrelated states or events, such as in a state diagram.

Figure 6:
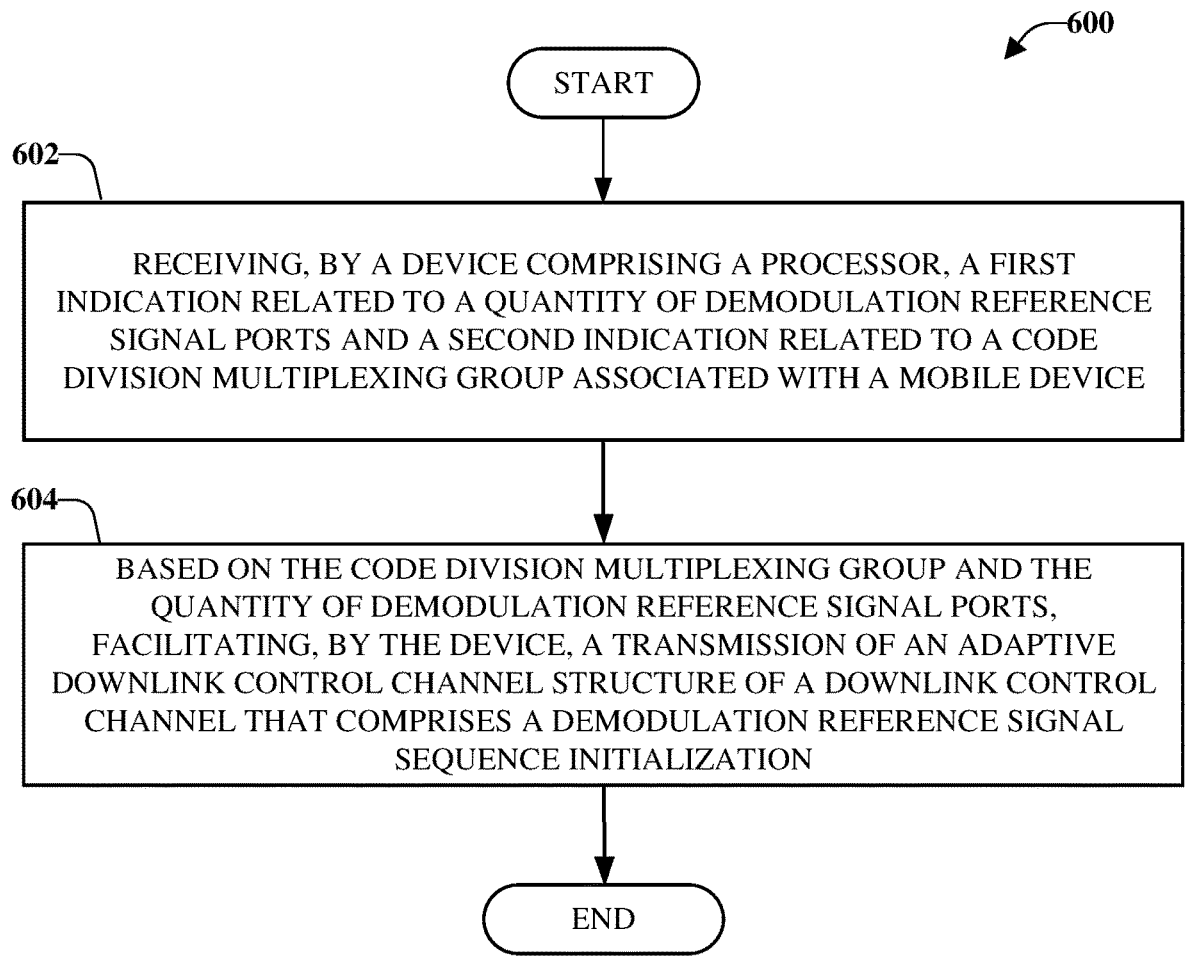
FIG. 6 illustrates a flow diagram of an example, non-limiting, computer-implemented method for facilitating port specific downlink control channel design for advanced networks in accordance with one or more embodiments described herein.

FIG. 6 illustrates a flow diagram of an example, non-limiting, computer-implemented method 600 for facilitating port specific downlink control channel design for advanced networks in accordance with one or more embodiments described herein. Repetitive description of like elements employed in other embodiments described herein is omitted for sake of brevity.

In some implementations, a system comprising a processor can perform the computer-implemented method 600 and/or other methods discussed herein. In other implementations, a device comprising a processor can perform the computer-implemented method 600 and/or other methods discussed herein. In other implementations, a machine-readable storage medium, can comprise executable instructions that, when executed by a processor, facilitate performance of operations, which can be the operations discussed with respect to the computer-implemented method 600 and/or other methods discussed herein. In further implementations, a computer readable storage device comprising executable instructions that, in response to execution, cause a system comprising a processor to perform operations, which can be operations discussed with respect to the computer-implemented method 600 and/or other methods discussed herein.

At 602 of the computer-implemented method 600, a system operatively coupled to one or more processors, can receive a first indication related to a quantity of demodulation reference signal ports and a second indication related to a code division multiplexing group associated with a mobile device (e.g., via the communication component 514). Based on the code division multiplexing group and the quantity of demodulation reference signal ports, at 604 of the computer-implemented method 600, the system can facilitate a transmission of an adaptive downlink control channel structure of a downlink control channel that comprises a demodulation reference signal sequence initialization (e.g., via the communication component 514). For example, the downlink control channel can comprise a downlink control channel configured to operate according to a fifth generation wireless network communication protocol.

Figure 7:
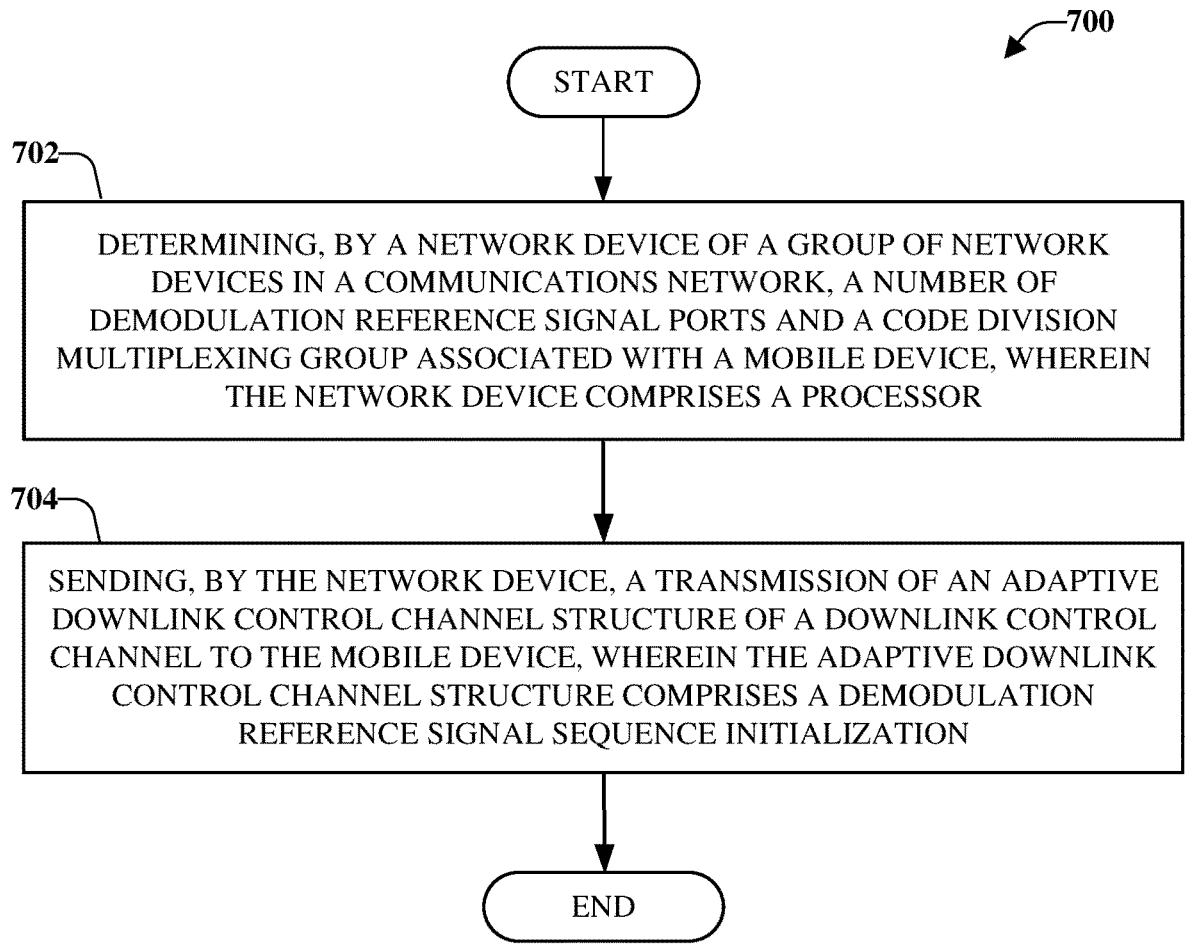
FIG. 7 illustrates a flow diagram of an example, non-limiting, computer-implemented method for scheduling a device with an adaptive downlink control channel structure in accordance with one or more embodiments described herein.

FIG. 7 illustrates a flow diagram of an example, non-limiting, computer-implemented method 700 for scheduling a device with an adaptive downlink control channel structure in accordance with one or more embodiments described herein. Repetitive description of like elements employed in other embodiments described herein is omitted for sake of brevity.

In some implementations, a system comprising a processor can perform the computer-implemented method 600, the computer-implemented method 700, and/or other methods discussed herein. In other implementations, a device comprising a processor can perform the computer-implemented method 600, the computer-implemented method 700, and/or other methods discussed herein. In other implementations, a machine-readable storage medium, can comprise executable instructions that, when executed by a processor, facilitate performance of operations, which can be the operations discussed with respect to the computer-implemented method 600, the computer-implemented method 700, and/or other methods discussed herein. In further implementations, a computer readable storage device comprising executable instructions that, in response to execution, cause a system comprising a processor to perform operations, which can be operations discussed with respect to the computer-implemented method 600, the computer-implemented method 700, and/or other methods discussed herein.

At 702 of the computer-implemented method 700, a system operatively coupled to one or more processors, can determine a number of demodulation reference signal ports and a code division multiplexing group associated with a mobile device (e.g., via the analysis component 516).

Further, at 704 of the computer-implemented method 700, the system can send a transmission of an adaptive downlink control channel structure of a downlink control channel to the mobile device (e.g., via the communication component 514). The adaptive downlink control channel structure can comprise a demodulation reference signal sequence initialization.

In an example, the determination can be based on receiving, from the mobile device, first information indicative of the number of demodulation reference signal ports associated with the mobile device and second information indicative of the code division multiplexing group associated with the mobile device. The second information can indicate that the code division multiplexing group comprises a first code division multiplexing group and a second code division multiplexing group. In this case, the demodulation reference signal sequence initialization can comprise a first group of two bits for the first code division multiplexing group and a second group of two bits for the second code division multiplexing group.

In another example, the code division multiplexing group is a single code division multiplexing group. Further to this example, the demodulation reference signal sequence initialization can comprise one bit.

According to some implementations, the computer-implemented method can comprise scheduling a Type 1 demodulation reference signal to the mobile device (e.g., via the scheduler component 120). Further to these implementations, the transmission can be sent via radio resource control signaling (e.g., via the communication component 514).

In accordance with some implementations, the computer-implemented method can comprise scheduling a Type 2 demodulation reference signal to the mobile device (e.g., via the scheduler component 120). Further to these implementations, a single bit can be transmitted for the demodulation reference signal sequence initialization (e.g., via the communication component 514). For example, a peak-to-average power ratio and a payload of the downlink control channel can be mitigated and/or reduced based on scheduling the Type 2 demodulation reference signal to the mobile device.

Figure 8:
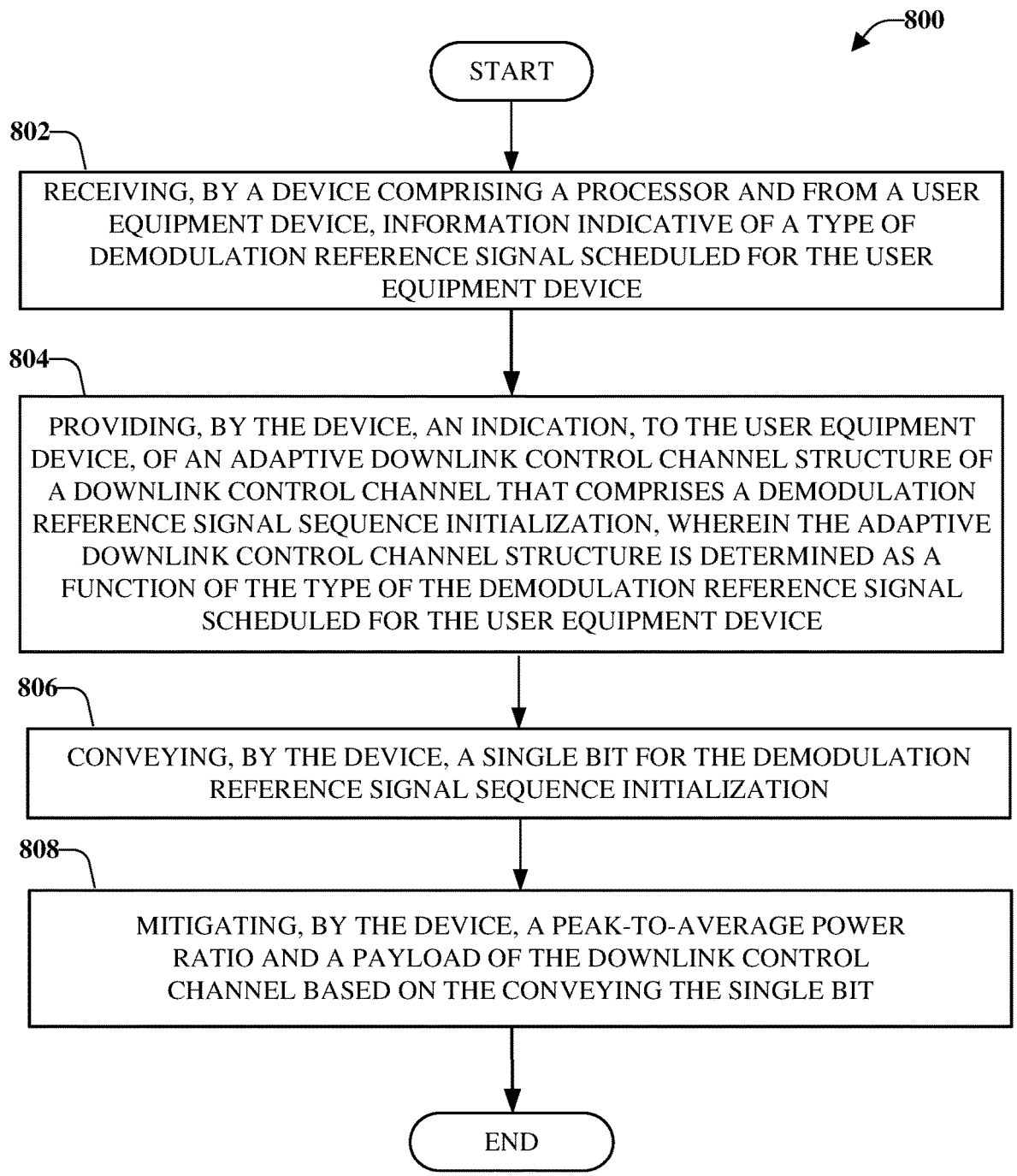
FIG. 8 illustrates a flow diagram of an example, non-limiting, computer-implemented method for using an adaptive control channel based on the type of the demodulation reference signal in accordance with one or more embodiments described herein.

FIG. 8 illustrates a flow diagram of an example, non-limiting, computer-implemented method 800 for using an adaptive control channel based on the type of the demodulation reference signal in accordance with one or more embodiments described herein. Repetitive description of like elements employed in other embodiments described herein is omitted for sake of brevity.

In some implementations, a system comprising a processor can perform the computer-implemented method 600, the computer-implemented method 700, the computer-implemented method 800, and/or other methods discussed herein. In other implementations, a device comprising a processor can perform the computer-implemented method 600, the computer-implemented method 700, the computer-implemented method 800, and/or other methods discussed herein. In other implementations, a machine-readable storage medium, can comprise executable instructions that, when executed by a processor, facilitate performance of operations, which can be the operations discussed with respect to the computer-implemented method 600, the computer-implemented method 700, the computer-implemented method 800, and/or other methods discussed herein. In further implementations, a computer readable storage device comprising executable instructions that, in response to execution, cause a system comprising a processor to perform operations, which can be operations discussed with respect to the computer-implemented method 600, the computer-implemented method 700, the computer-implemented method 800, and/or other methods discussed herein.

At 802 of computer-implemented method 800, a system operatively coupled to one or more processors, can receive, from a user equipment device, information indicative of a type of demodulation reference signal scheduled for the user equipment device. Further, at 804 of the computer-implemented method 800, the system can provide an indication, to the user equipment device, of an adaptive downlink control channel structure of a downlink control channel that comprises a demodulation reference signal sequence initialization. The adaptive downlink control channel structure can be determined as a function of the type of the demodulation reference signal scheduled for the user equipment device.

The type of demodulation reference signal scheduled for the user equipment device can be a Type 2 demodulation reference signal configured for the user equipment device. Thus, at 806 of the computer-implemented method, the system can convey a single bit for the demodulation reference signal sequence initialization. In addition, at 808 of the computer-implemented method 800 a peak-to-average power ratio and a payload of the downlink control channel can be mitigated based on convey the single bit at 806.

Described herein are systems, methods, articles of manufacture, and other embodiments or implementations that can facilitate an antenna port specific downlink control channel design in advanced networks. Facilitating an antenna port specific downlink control channel design for advanced networks can be implemented in connection with any type of device with a connection to the communications network (e.g., a mobile handset, a computer, a handheld device, etc.) any Internet of things (IoT) device (e.g., toaster, coffee maker, blinds, music players, speakers, etc.), and/or any connected vehicles (cars, airplanes, space rockets, and/or other at least partially automated vehicles (e.g., drones)). In some embodiments, the non-limiting term User Equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, Laptop Embedded Equipped (LEE), laptop mounted equipment (LME), USB dongles etc. Note that the terms element, elements and antenna ports can be interchangeably used but carry the same meaning in this disclosure. The embodiments are applicable to single carrier as well as to Multi-Carrier (MC) or Carrier Aggregation (CA) operation of the UE. The term Carrier Aggregation (CA) is also called (e.g., interchangeably called) "multi-carrier system," "multi-cell operation," "multi-carrier operation," "multi-carrier" transmission and/or reception.

In some embodiments, the non-limiting term radio network node or simply network node is used. It can refer to any type of network node that serves one or more UEs and/or that is coupled to other network nodes or network elements or any radio node from where the one or more UEs receive a signal. Examples of radio network nodes are Node B, Base Station (BS), Multi-Standard Radio (MSR) node such as MSR BS, eNode B, network controller, Radio Network Controller (RNC), Base Station Controller (BSC), relay, donor node controlling relay, Base Transceiver Station (BTS), Access Point (AP), transmission points, transmission nodes, RRU, RRH, nodes in Distributed Antenna System (DAS) etc.

Cloud Radio Access Networks (RAN) can enable the implementation of concepts such as Software-Defined Network (SDN) and Network Function Virtualization (NFV) in 6G networks. This disclosure can facilitate a generic channel state information framework design for a 6G network. Certain embodiments of this disclosure can comprise an SDN controller that can control routing of traffic within the network and between the network and traffic destinations. The SDN controller can be merged with the 6G network architecture to enable service deliveries via open Application Programming Interfaces (APIs) and move the network core towards an all Internet Protocol (IP), cloud based, and software driven telecommunications network. The SDN controller can work with, or take the place of, Policy and Charging Rules Function (PCRF) network elements so that policies such as quality of service and traffic management and routing can be synchronized and managed end to end.

Figure 9:
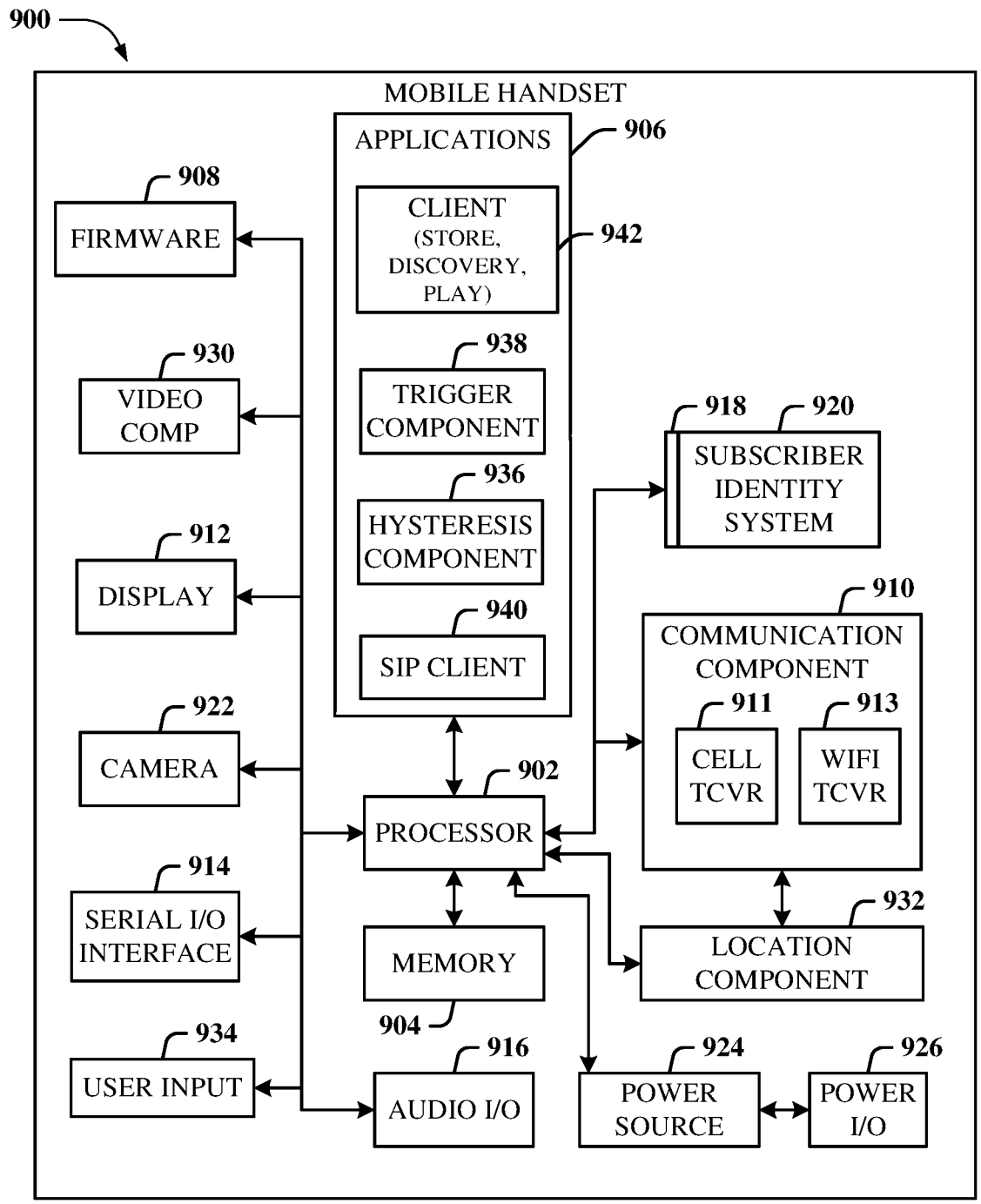
FIG. 9 illustrates an example block diagram of an example mobile handset operable to engage in a system architecture that facilitates wireless communications according to one or more embodiments described herein.

Referring now to FIG. 9, illustrated is an example block diagram of an example mobile handset 900 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information, and which can be accessed by the computer.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This can support updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communications component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or decoded format.

A video processing component 922 (e.g., a camera) can be provided for decoding encoded multimedia content. The video processing component 922 can aid in facilitating the generation, editing, and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touchscreen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 936 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
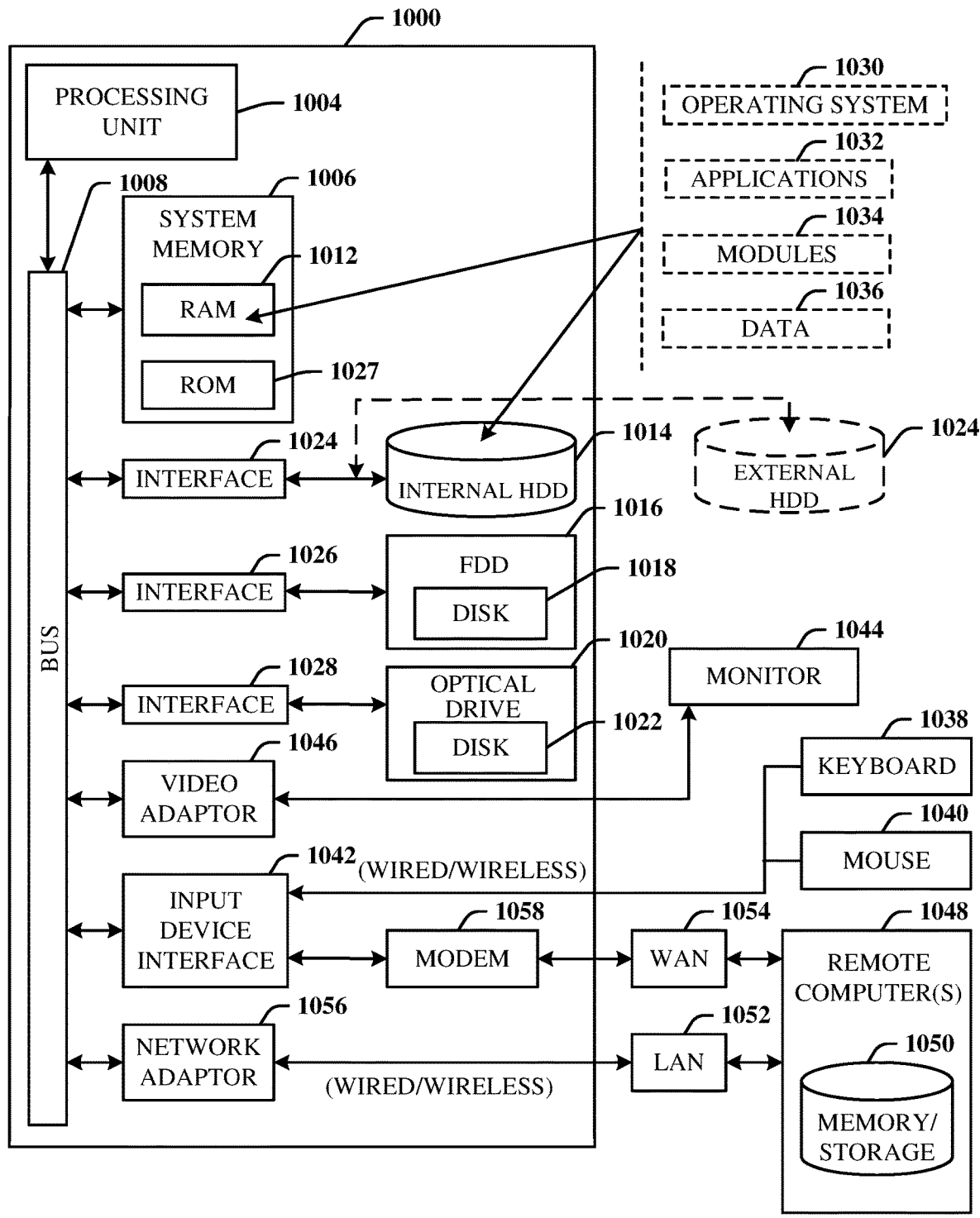
FIG. 10 illustrates an example block diagram of an example computer operable to engage in a system architecture that facilitates wireless communications according to one or more embodiments described herein.

Referring now to FIG. 10, illustrated is an example block diagram of an example computer 1000 operable to engage in a system architecture that facilitates wireless communications according to one or more embodiments described herein. The computer 1000 can provide networking and communication capabilities between a wired or wireless communication network and a server (e.g., Microsoft server) and/or communication device. In order to provide additional context for various aspects thereof, FIG. 10 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 10, implementing various aspects described herein with regards to the end-user device can include a computer 1000, the computer 1000 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1027 and random access memory (RAM) 1012. A basic input/output system (BIOS) is stored in a non-volatile memory 1027 such as ROM, EPROM, EEPROM, which BIOS contains the basic routines that help to transfer information between elements within the computer 1000, such as during start-up. The RAM 1012 can also include a high-speed RAM such as static RAM for caching data.

The computer 1000 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1000 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1000, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is to be appreciated that the innovation can be implemented with various commercially available operating systems or combinations of operating systems.

A user can enter commands and information into the computer 1000 through one or more wired/wireless input devices, e.g., a keyboard 1038 and a pointing device, such as a mouse 1040. Other input devices (not shown) can include a microphone, an IR remote control, a joystick, a game pad, a stylus pen, touchscreen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 through an interface, such as a video adapter 1046. In addition to the monitor 1044, a computer 1000 typically includes other peripheral output devices (not shown), such as speakers, printers, etc.

The computer 1000 can operate in a networked environment using logical connections by wired and/or wireless communications to one or more remote computers, such as a remote computer(s) 1048. The remote computer(s) 1048 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1000 is connected to the local network 1052 through a wired and/or wireless communication network interface or adapter 1056. The adapter 1056 can facilitate wired or wireless communication to the LAN 1052, which can also include a wireless access point disposed thereon for communicating with the wireless adapter 1056.

When used in a WAN networking environment, the computer 1000 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 through the input device interface 1042. In a networked environment, program modules depicted relative to the computer, or portions thereof, can be stored in the remote memory/storage device 1050. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and BluetoothTM wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 6 GHz radio bands, at an 9 Mbps (802.11a) or 64 Mbps (802.11b) data rate, for example, or with products that contain both bands (dual band), so the networks can provide real-world performance similar to the basic 16BaseT wired Ethernet networks used in many offices.

An aspect of 6G, which differentiates from previous 4G systems, is the use of NR. NR architecture can be designed to support multiple deployment cases for independent configuration of resources used for RACH procedures. Since the NR can provide additional services than those provided by LTE, efficiencies can be generated by leveraging the pros and cons of LTE and NR to facilitate the interplay between LTE and NR, as discussed herein.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

The various aspects described herein can relate to New Radio (NR), which can be deployed as a standalone radio access technology or as a non-standalone radio access technology assisted by another radio access technology, such as Long Term Evolution (LTE), for example. It should be noted that although various aspects and embodiments have been described herein in the context of 6G, Universal Mobile Telecommunications System (UMTS), and/or Long Term Evolution (LTE), or other next generation networks, the disclosed aspects are not limited to 6G, a UMTS implementation, and/or an LTE implementation as the techniques can also be applied in 3G, 4G, or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

As used herein, "5G" can also be referred to as NR access. Accordingly, systems, methods, and/or machine-readable storage media for facilitating link adaptation of downlink control channel for 6G systems are desired. As used herein, one or more aspects of a 6G network can comprise, but is not limited to, data rates of several tens of megabits per second (Mbps) supported for tens of thousands of users; at least one gigabit per second (Gbps) to be offered simultaneously to tens of users (e.g., tens of workers on the same office floor); several hundreds of thousands of simultaneous connections supported for massive sensor deployments; spectral efficiency significantly enhanced compared to 4G; improvement in coverage relative to 4G; signaling efficiency enhanced compared to 4G; and/or latency significantly reduced compared to LTE.

Systems, methods and/or machine-readable storage media for facilitating a two-stage downlink control channel for 6G systems are provided herein. Legacy wireless systems such as LTE, Long-Term Evolution Advanced (LTE-A), High Speed Packet Access (HSPA) etc. use fixed modulation format for downlink control channels. Fixed modulation format implies that the downlink control channel format is always encoded with a single type of modulation (e.g., quadrature phase shift keying (QPSK)) and has a fixed code rate. Moreover, the forward error correction (FEC) encoder uses a single, fixed mother code rate of ⅓ with rate matching. This design does not take into the account channel statistics. For example, if the channel from the BS device to the mobile device is very good, the control channel cannot use this information to adjust the modulation, code rate, thereby unnecessarily allocating power on the control channel. Similarly, if the channel from the BS to the mobile device is poor, then there is a probability that the mobile device might not able to decode the information received with only the fixed modulation and code rate. As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification procedures and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable media can comprise, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:
1. A system, comprising:
a processor; and
a memory that stores executable instructions that, when executed by the processor, facilitate performance of operations, comprising:
receiving a first indication related to a quantity of demodulation reference signal ports and a second indication related to a quantity of code division multiplexing groups associated with a user equipment;
changing a payload of a downlink control channel based on the quantity of code division multiplexing groups, wherein the changing comprises:
based on the quantity of code division multiplexing groups indicating a single code division multi- plexing group, changing the payload to a single bit for initialization of the single code division multiplexing group, and based on the quantity of code division multiplexing groups indicating multiple code division multiplexing groups comprising a first code division multiplexing group and a second code division multiplexing group, changing the payload to a first group of two bits for a first demodulation reference signal sequence initialization for the first code division multiplexing group and a second group of two bits for a second demodulation reference signal sequence initialization for the second code division multiplexing group; and transmitting, to the user equipment, data via the downlink control channel, wherein the transmitting comprises:

based on the quantity of code division multiplexing groups indicating the single code division multiplexing group, transmitting, via the downlink control channel, the single bit for the initialization of the single code division multiplexing group, and based on the quantity of code division multiplexing groups indicating the multiple code division multiplexing groups comprising the first code division multiplexing group and the second code division multiplexing group, transmitting, via the downlink control channel, the first group of two bits for the first demodulation reference signal sequence initialization for the first code division multiplexing group and the second group of two bits for the second demodulation reference signal sequence initialization for the second code division multiplexing group.

2. The system of claim 1, wherein the second indication indicates that the code division multiplexing groups of the quantity of code division multiplexing groups comprise the first code division multiplexing group and the second code division multiplexing group.

3. The system of claim 1, wherein the transmitting of the data via the downlink control channel comprises reducing the payload of the downlink control channel based on the quantity of code division multiplexing groups and the quantity of demodulation reference signal ports.

4. The system of claim 1, wherein the receiving comprises receiving a third indication of a software release version of the user equipment satisfying a defined software release version, and wherein the transmitting comprises facilitating an adaptive control channel based on the software release version.

5. The system of claim 1, wherein the transmitting of the single bit comprises scheduling the user equipment with a Type 1 demodulation reference signal via radio resource control signaling.

6. The system of claim 1, wherein the transmitting of the first group of two bits and the second group of two bits comprises:

scheduling the user equipment with a Type 2 demodulation reference signal, and conveying the single bit for the demodulation reference signal sequence initialization.

7. The system of claim 6, wherein the conveying comprises reducing a peak-to-average power ratio and the payload of the downlink control channel based on the single bit being conveyed based on the quantity of code division multiplexing groups and the quantity of demodulation reference signal ports.

8. The system of claim 1, wherein the downlink control channel comprises a downlink control channel configured to operate according to a fifth generation communication protocol.

9. A method, comprising:

determining, by network equipment comprising a processor, a number of demodulation reference signal ports and a number of code division multiplexing groups associated with a user equipment;

changing, by the network equipment, a payload of downlink control information of an adaptive downlink control channel structure of a downlink control channel based on the number of code division multiplexing groups used for a demodulation reference signal transmission, wherein the changing comprises:

based on the number of code division multiplexing groups being one code division multiplexing group, changing the payload to a single bit for the one code division multiplexing group, and based on the number of code division multiplexing groups being more than one code division multiplexing group comprising a first code division multiplexing group and a second code division multiplexing group, changing the payload to a first group of two bits for the first code division multiplexing group and a second group of two bits for the second code division multiplexing group;

sending, by the network equipment, a transmission of data via the adaptive downlink control channel structure of the downlink control channel to the user equipment, wherein the adaptive downlink control channel structure comprises a demodulation reference signal sequence initialization, and wherein the demodulation reference signal sequence initialization comprises:

based on the number of code division multiplexing groups being the one code division multiplexing group, the single bit for initialization of the one code division multiplexing group, and based on the number of code division multiplexing groups being more than one code division multiplexing group comprising the first code division multiplexing group and the second code division multiplexing group, the first group of two bits for a first demodulation reference signal sequence initialization for the first code division multiplexing group and the second group of two bits for a second demodulation reference signal sequence initialization for the second code division multiplexing group.

10. The method of claim 9, further comprising:

scheduling, by the network equipment, a Type 1 demodulation reference signal to the user equipment, wherein the sending comprises sending the transmission via radio resource control signaling.

11. The method of claim 9, further comprising:

scheduling, by the network equipment, a Type 2 demodulation reference signal to the user equipment, wherein the sending comprises transmitting the single bit for the demodulation reference signal sequence initialization.

12. The method of claim 11, further comprising:

mitigating, by the network equipment, a peak-to-average power ratio and a payload of the downlink control channel based on the scheduling the Type 2 demodulation reference signal to the user equipment.

13. The method of claim 9, further comprising:

receiving, by the network equipment, first information indicative of the number of demodulation reference signal ports associated with the user equipment, and second information indicative of the number of code division multiplexing groups associated with the user equipment.

14. The method of claim 13, wherein the second information indicates that the number of code division multiplexing groups comprises the first code division multiplexing group and the second code division multiplexing group.

15. The method of claim 9, wherein the downlink control channel comprises a downlink control channel configured to operate according to a fifth generation communication protocol.

16. A non-transitory machine-readable medium, comprising executable instructions that, when executed by a processor, facilitate performance of operations, comprising:
   receiving, from network equipment, information indicative of a number of code division multiplexing groups scheduled for a user equipment; and
   receiving via a downlink control channel a demodulation reference signal sequence initialization, wherein the downlink control channel comprises a payload determined as a function of the number of code division multiplexing groups used for a demodulation reference signal transmission, and wherein,
   based on the number of code division multiplexing groups indicating one code division multiplexing group, the payload of the downlink control channel comprises a single bit for the demodulation reference signal sequence initialization for the one code division multiplexing group, and
   based on the number of code division multiplexing groups indicating multiple groups comprising a first code division multiplexing group and a second code division multiplexing group, the payload of the downlink control channel comprises a first group of two bits for a first demodulation reference signal sequence initialization for the first code division multiplexing group and a second group of two bits for a second demodulation reference signal sequence initialization for the second code division multiplexing group.

17. The non-transitory machine-readable medium of claim 16, wherein a type of demodulation reference signal scheduled for the user equipment is a Type 2 demodulation reference signal configured for the user equipment, and wherein the operations further comprise conveying the single bit for the demodulation reference signal sequence initialization.

18. The non-transitory machine-readable medium of claim 17, wherein the operations further comprise mitigating a peak-to-average power ratio and the payload of the downlink control channel based on the conveying the single bit.

19. The non-transitory machine-readable medium of claim 16, further comprising:
   prior to receiving of the information indicative of the number of code division multiplexing groups, transmitting, to the network equipment, first information indicative of a number of demodulation reference signal ports.

20. The non-transitory machine-readable medium of claim 16, wherein the first group of two bits and the second group of two bits are configured to facilitate a mitigation of a peak-to-average power ratio.

* * * * *